United States Patent
Liu et al.

(10) Patent No.: US 11,499,863 B2
(45) Date of Patent: Nov. 15, 2022

(54) CARRIER STRUCTURE FOR MULTIPLE WEIGHT SENSORS

(71) Applicant: ShangHai TIMEMORE Coffee Equipment CO., LTD, Shanghai (CN)

(72) Inventors: Bin Liu, Shanghai (CN); Huachun Zhan, Shanghai (CN)

(73) Assignee: ShangHai TIMEMORE Coffee Equipment CO., LTD, Shanghai (CN)

(*) Notice: Subject to any disclaimer, the term of this patent is extended or adjusted under 35 U.S.C. 154(b) by 286 days.

(21) Appl. No.: 17/072,759

(22) Filed: Oct. 16, 2020

(65) Prior Publication Data

US 2022/0120605 A1 Apr. 21, 2022

(51) Int. Cl.
*G01G 21/23* (2006.01)

(52) U.S. Cl.
CPC .................... *G01G 21/23* (2013.01)

(58) Field of Classification Search
CPC ...................................... G01G 21/23
See application file for complete search history.

(56) References Cited

U.S. PATENT DOCUMENTS

| | | | | |
|---|---|---|---|---|
| 5,770,823 A * | 6/1998 | Piroozmandi | ........ | G01G 19/52 177/144 |
| 6,320,142 B1 * | 11/2001 | Burton | ........ | G01G 21/23 177/DIG. 9 |
| 8,431,839 B2 * | 4/2013 | Hornstein | ........ | B66F 7/28 177/208 |
| 8,975,541 B2 * | 3/2015 | Hornstein | ........ | G01G 5/006 177/208 |
| 9,174,831 B2 * | 11/2015 | Rothkegel | ........ | G01G 3/141 |
| 9,651,413 B2 * | 5/2017 | Jaeger | ........ | G01G 21/23 |
| 10,365,149 B2 | 7/2019 | Gough et al. | | |
| 10,986,810 B2 * | 4/2021 | Hogan | ........ | G01G 17/00 |
| 2007/0198222 A1 | 8/2007 | Schuster et al. | | |
| 2020/0323169 A1 * | 10/2020 | Hogan | ........ | G01G 17/00 |

FOREIGN PATENT DOCUMENTS

| | | |
|---|---|---|
| CN | 206556759 U | 10/2017 |
| CN | 208244128 U | 12/2018 |

* cited by examiner

*Primary Examiner* — Randy W Gibson

(57) ABSTRACT

The utility model discloses a carrier structure for multiple weight sensors, comprising bearing assemblies and a positioning device, wherein at least two bearing assemblies are provided; and the bearing assembly comprises a positioning end and a bearing branch end, the positioning end is fixedly connected with the bearing branch end, and a positioning hole is formed in one end face of the bearing branch end. According to the carrier structure for the multiple weight sensors, multiple weight sensor units in multiple directions can be combined, designed and mounted according to requirements, and quality detection information in multiple directions is obtained through the multiple weight sensing units, thus realizing multi-point and multi-position measurement; and the weight sensor units of multiple specifications can be designed and mounted at the same time, so that a corresponding sensing mode is effectively selected according to actual use conditions, thus improving measurement accuracy.

6 Claims, 2 Drawing Sheets

CARRIER STRUCTURE FOR MULTIPLE WEIGHT SENSORS

CROSS-REFERENCE TO RELATED APPLICATIONS

This application claims priority to Chinese Patent Application No. 201921065943.7 with a filing date of Jul. 9, 2019. The content of the aforementioned applications, including any intervening amendments thereto, are incorporated herein by reference.

TECHNICAL FIELD

The utility model relates to the field of weight sensor technologies, and more particularly, to a carrier structure of multiple weight sensors.

BACKGROUND

A weight sensor is actually a device that converts a quality signal into a measurable electrical signal for output. An actual working environment of the sensor should be considered first before the sensor is in use, which is very important for correctly selecting the weight sensor, and decides whether the sensor can work normally and safely, and is related to a service life of the sensor, and even related to a reliability and a safety of a whole weighing apparatus. There are qualitative differences between the old and new national standards in basic concepts and evaluation methods of main technical indicators of the weight sensor.

The weight sensors need to be fixed by carriers during installation, and each weight sensor unit needs to correspond to one carrier. The weight sensor carriers used at present are generally installed and fixed in a single way, which have limited measurement point locations, and cannot measure multiple detection points at the same time. A measurement direction during measurement is single, resulting in that the weight sensors can only measure values in one direction; moreover, and a position of signal interfaces is single, which is inconvenient to connect transmission cables. Therefore, a carrier structure for multiple weight sensors is proposed to solve the above problems.

SUMMARY

The utility model provides a carrier structure for multiple weight sensors, which aims at combined installation of multiple weight sensors.

In order to achieve the above objective, the utility model provides the following technical solutions.

A carrier structure for multiple weight sensors comprises bearing assemblies and a positioning device, wherein at least two bearing assemblies are provided;

the bearing assembly comprises a positioning end and a bearing branch end, the positioning end is fixedly connected with the bearing branch end, a positioning hole is formed in one end face of the bearing branch end, and a sensor unit chip is adhered on the bearing branch end through glue;

the positioning device comprises a bearing plate and a positioning assembly, the positioning assembly is fixedly mounted outside the bearing plate, and the positioning hole connects the positioning end on the at least one bearing assembly (1) with the bearing plate (21) through a screw; and the bearing branch end comprises a carrying end, a placing end, fixture blocks, a clamping ring a stopper, springs and chucks, one end of the placing end extends to the carrying end, two fixture blocks are fixedly mounted outside the carrying end, the clamping ring attached to a right end of the carrying end is fixedly mounted outside the placing end, the stopper clamped with the fixture block is sleeved outside the placing end, two springs are fixedly mounted on an outer side of one end of the placing end located in the carrying end, and opposite ends of the two springs are fixedly provided with the chucks clamped with the bearing end.

Further, a signal connecting line is led out from any port of the bearing branch end and connected.

Further, a signal connecting line is led out from any of the positioning end and connected.

Further, the positioning assembly comprises but is not limited to a cubic bottom plate, a cylindrical bottom plate and a circular pipe, and the circular pipe is a circular pipe fitting with one end closed and the other end opened.

Further, the bearing branch end is provided with a fixing piece for fixing a bracket.

Further, a material of the carrier structure comprises but is not limited to aluminum, aluminum alloy and titanium alloy.

According to the carrier structure for the multiple weight sensors of the utility model, multiple weight sensor units in multiple directions can be combined, designed and mounted according to requirements, and quality detection information in multiple directions is obtained through the multiple weight sensing units, thus realizing multi-point and multi-position measurement; the weight sensor units of multiple specifications can be designed and mounted at the same time, and sensing modes such as a resistance strain gauge mode, a capacitance mode, a charge mode, an inductance mode and an electromagnetic mode are realized by switching the weight sensor units of various systems, and communication signals are received and sent, so that a corresponding sensing mode is effectively selected according to actual use conditions, thus improving measurement accuracy. Moreover, the carrier structure is convenient to dismount and transport, and does not occupy too much space during storage, and is convenient for storage.

Figure 1:
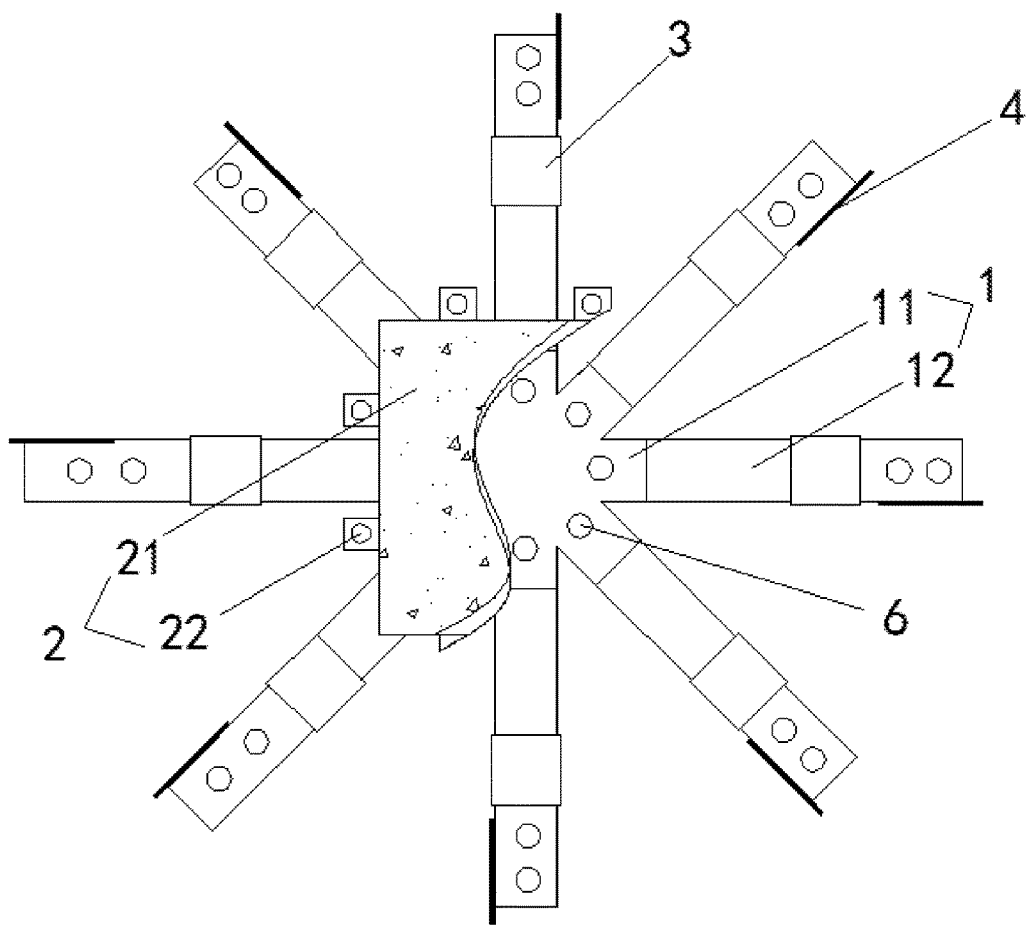
FIG. 1 is a schematic structure diagram of the utility model.
Figure 2:
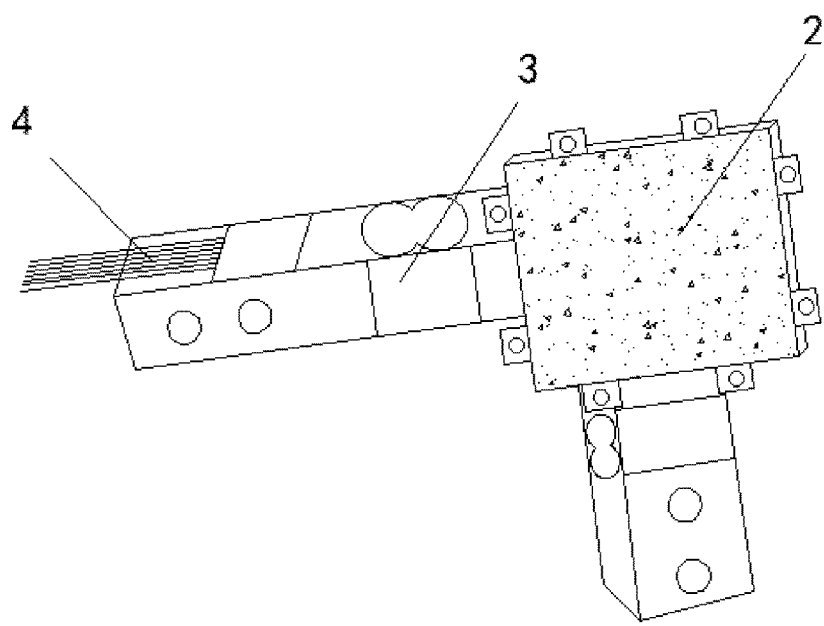
FIG. 2 is a schematic diagram of a partial structure of the utility model.
Figure 3:
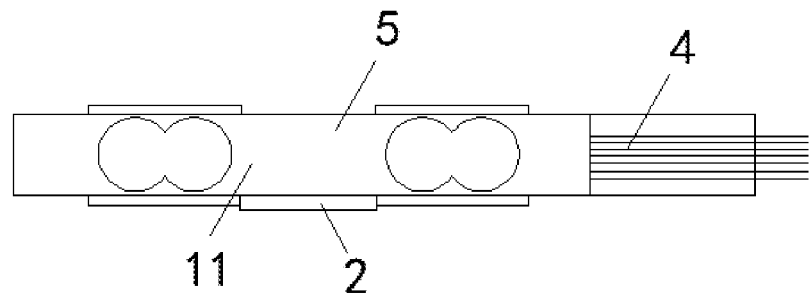
FIG. 3 is a schematic structure diagram of a bearing assembly of the utility model.
Figure 4:
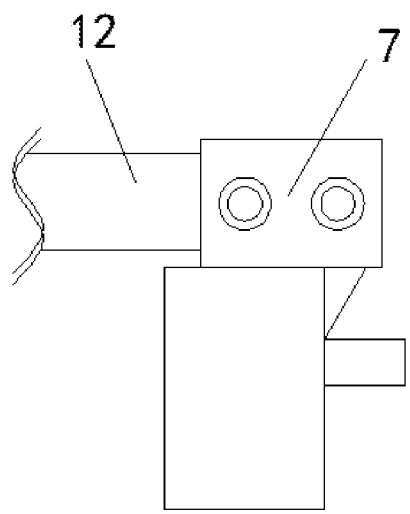
FIG. 4 is a schematic structure diagram of a bearing branch end of the utility mode.

In the figures: 1 bearing assembly, 11 positioning end, 12 bearing branch end, 121 carrying end, 122 carrying end, 123 carrying end, 124 carrying end, 125 carrying end, 126 spring, 127 chuck, 2 positioning device, 21 bearing plate, 22 positioning assembly, 3 sensor unit chip, 4 terminal, 5 screw, 6 positioning hole, and 7 fixing piece.

DETAILED DESCRIPTION

To make the objectives, technical solutions, and advantages of the utility model clearer, the utility model will be further described in detail with reference to the accompanying drawings and embodiments. It should be understood that the specific embodiments described herein are only used to explain the utility model, but are not intended to limit the utility model.

First Embodiment

Referring to FIGS. 1 to 4, a carrier structure for multiple weight sensors comprises bearing assemblies 1 and a positioning device 2, wherein at least two bearing assemblies 1 are provided.

The bearing assembly 1 comprises a positioning end 11 and a bearing branch end 12, the positioning end 11 is fixedly connected with the bearing branch end 12, a positioning hole 6 is formed in one end face of the bearing branch end 12, and a sensor unit chip 3 is adhered on the bearing branch end 12 through glue. The bearing branch end 12 is used for bearing a measured object, and measuring directions of the multiple bearing assemblies 1 may be the same or different. The bearing branch end 12 on the multiple bearing assemblies 1 may be selected according to requirements. By installing a weight sensor unit on the sensor unit chip 3 on the corresponding bearing branch end 12, a specification of the weight sensor unit may be selected accordingly, such as a weight sensor of a resistance strain gauge mode, a capacitance mode, an inductance mode, an electromagnetic mode and a charge mode.

The positioning device 2 comprises a bearing plate 21 and a positioning assembly 22, the positioning assembly 22 is fixedly mounted outside the bearing plate 21, and the positioning hole 6 connects the positioning ends 11 on the at least two bearing assemblies 1 with the bearing plate 21 through a screw 5, or the like.

Figure 5:
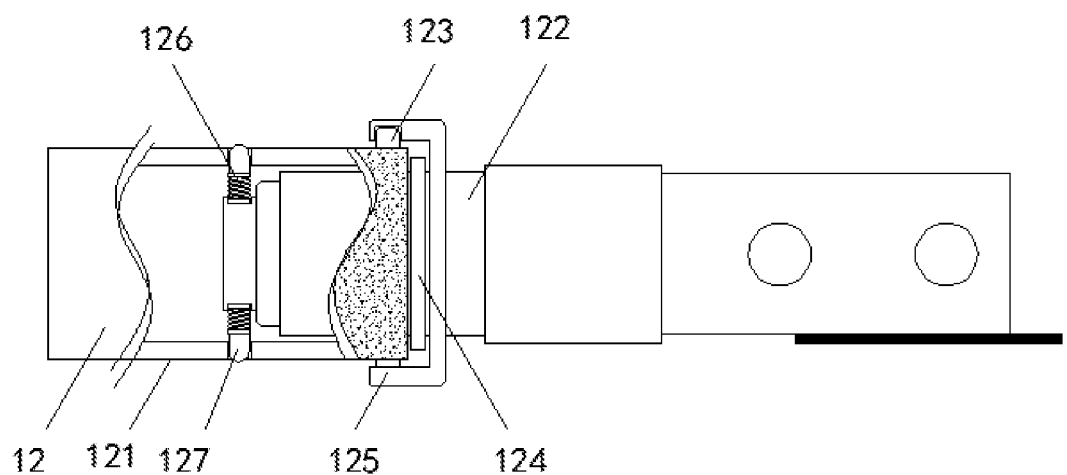
FIG. 5 is a schematic structure diagram of a bearing branch end.

As shown in FIG. 5, the bearing branch end 12 comprises a carrying end 121, a placing end 122, fixture blocks 123, a clamping ring 124, a stopper 125, springs 126 and chucks 127, one end of the placing end 122 extends to the carrying end 121, two fixture blocks 123 are fixedly mounted outside the carrying end 121, the clamping ring 124 attached to a right end of the carrying end 121 is fixedly mounted outside the placing end 122, the stopper 125 clamped with the fixture block 123 is sleeved outside the placing end 122, two springs 126 are fixedly mounted on an outer side of one end of the placing end 122 located in the carrying end 121, and opposite ends of the two springs 126 are fixedly provided with the chucks 127 clamped with the bearing end 121. The clamping ring 124 is seized with the carrying end 121 by butting the placing end 122 with the carrying end 121, the springs 126 pushes the chucks 127 to seize with the carrying end 121, and the stopper 125 is rotated, so that the stopper 125 is clamped with the stopper 123, thus fixing an external portion of the carrying end 121 and connecting the carrying end 121 with the placing end 122, so that a space ratio can be reduced by disassembly during transportation, which is convenient for storage.

A material of the carrier structure comprises but is not limited to aluminum, aluminum alloy and titanium alloy.

A signal connecting line is led out from any port of the bearing branch end 12 and connected, or the signal connecting line is led out from any of the positioning end and connected. The positioning assembly 22 comprises but is not limited to a cubic bottom plate, a cylindrical bottom plate and a circular pipe, and the circular pipe is a circular pipe fitting with one end closed and the other end opened. The bearing branch end 12 is provided with a fixing piece 7 for fixing a bracket.

An object to be measured is placed on the bearing branch end 12, and the weight sensor unit on the sensor unit chip 3 is started. The weight sensors of the resistance strain gauge mode, the capacitance mode, the inductance mode, the electromagnetic mode and the charge mode can sense signals in turn through the resistance strain gauge mode, the capacitance mode, the inductance mode, the electromagnetic mode and the charge mode and convert the signals into measurement signals for transmission. The multiple weight sensors can measure with multiple contacts at the same time, thus effectively increasing detection points and increasing a diversity of measurement. Moreover, multi-point, multi-position and multi-directional weight values can also be calculated by simultaneously operating the weight sensors of the resistance strain gauge mode, the capacitance mode, the inductance mode, the electromagnetic mode and the charge mode, so as to improve measurement accuracy.

In conclusion, according to the carrier structure for the multiple weight sensors, the multiple weight sensor units in the multiple directions can be combined, designed and mounted according to requirements, and quality detection information in the multiple directions is obtained through the multiple weight sensing units, thus realizing multi-point and multi-position measurement; the weight sensor units of multiple specifications can be designed and mounted at the same time, and sensing modes such as the resistance strain gauge mode, the capacitance mode, the charge mode, the inductance mode and the electromagnetic mode are realized by switching the weight sensor units of various systems, and communication signals are received and sent, so that a corresponding sensing mode is effectively selected according to actual use conditions, thus improving the measurement accuracy.

The above are only the preferred specific embodiments of the present utility model, but the protection scope of the present utility model is not limited to this. Any equivalent substitution or change made by those familiar with this art within the technical scope disclosed by the utility model according to the technical solution of the utility model and the concept of the utility model shall fall within the protection scope of the utility model.

What is claimed is:

1. A carrier structure for multiple weight sensors, comprising bearing assemblies (1) and a positioning device (2), wherein at least two bearing assemblies (1) are provided;
the bearing assembly (1) comprises a positioning end (11) and a bearing branch end (12), the positioning end (11) is fixedly connected with the bearing branch end (12), a positioning hole (6) is formed in one end face of the bearing branch end (12), and a sensor unit chip (3) is adhered on the bearing branch end (12) through glue;
the positioning device (2) comprises a bearing plate (21) and a positioning assembly (22), the positioning assembly (22) is fixedly mounted outside the bearing plate (21), and the positioning hole (6) connects the positioning ends (11) on the at least two bearing assemblies (1) with the bearing plate (21) through a screw (5); and
the bearing branch end (12) comprises a carrying end (121), a placing end (122), fixture blocks (123), a clamping ring (124), a stopper (125), springs (126) and chucks (127), one end of the placing end (122) extends to the carrying end (121), two fixture blocks (123) are fixedly mounted outside the carrying end (121), the clamping ring (124) attached to a right end of the carrying end (121) is fixedly mounted outside the placing end (122), the stopper (125) clamped with the fixture block (123) is sleeved outside the placing end (122), two springs (126) are fixedly mounted on an outer side of one end of the placing end (122) located in the carrying end (121), and opposite ends of the two springs (126) are fixedly provided with the chucks (127) clamped with the bearing end (121).

2. The carrier structure for the multiple weight sensors according to claim 1, wherein a signal connecting line is led out from any port of the bearing branch end (12) and connected.

3. The carrier structure for the multiple weight sensors according to claim 1, wherein a signal connecting line is led out from any of the positioning end (11) and connected.

4. The carrier structure for the multiple weight sensors according to claim 1, wherein the positioning assembly (22) comprises but is not limited to a cubic bottom plate, a cylindrical bottom plate and a circular pipe, and the circular pipe is a circular pipe fitting with one end closed and the other end opened.

5. The carrier structure for the multiple weight sensors according to claim 1, wherein the bearing branch end (12) is provided with a fixing piece (7) for fixing a bracket.

6. The carrier structure for the multiple weight sensors according to claim 1, wherein a material of the carrier structure comprises but is not limited to aluminum, aluminum alloy and titanium alloy.

\* \* \* \* \*